(12) United States Patent
Shinomiya et al.

(10) Patent No.: US 8,438,292 B2
(45) Date of Patent: May 7, 2013

(54) NETWORK SYSTEM ESTABLISHING COMMUNICATION BY USE OF CONNECTIONLESS PROTOCOL

(75) Inventors: Hirotatsu Shinomiya, Sakai (JP); Hisataka Fujii, Takarazuka (JP)

(73) Assignee: Panasonic Corporation, Kadoma-shi (JP)

( * ) Notice: Subject to any disclaimer, the term of this patent is extended or adjusted under 35 U.S.C. 154(b) by 443 days.

(21) Appl. No.: 12/733,365

(22) PCT Filed: Aug. 27, 2008

(86) PCT No.: PCT/JP2008/065289
§ 371 (c)(1),
(2), (4) Date: May 21, 2010

(87) PCT Pub. No.: WO2009/028545
PCT Pub. Date: Mar. 5, 2009

(65) Prior Publication Data
US 2010/0281175 A1    Nov. 4, 2010

(30) Foreign Application Priority Data

Aug. 27, 2007    (JP) ................................ 2007-220295

(51) Int. Cl.
*G06F 15/16* (2006.01)
(52) U.S. Cl.
USPC .............................................. 709/228; 726/3
(58) Field of Classification Search .................. 709/202, 709/203; 370/389, 401; 713/200
See application file for complete search history.

(56) References Cited

U.S. PATENT DOCUMENTS
2003/0046580 A1* 3/2003 Taniguchi et al. ............ 713/200
2003/0236824 A1* 12/2003 Alsafadi et al. ............... 709/203
(Continued)

FOREIGN PATENT DOCUMENTS
JP        09-139742 A       5/1997
JP        2001-306191 A    11/2001
(Continued)

OTHER PUBLICATIONS

International Search Report dated Oct. 21, 2008, issued on PCT/JP2008/065289.
(Continued)

*Primary Examiner* — Dustin Nguyen
(74) *Attorney, Agent, or Firm* — Edwards Wildman Palmer LLP; James E. Armstrong, IV; George N. Chaclas

(57) ABSTRACT

Equipment 1 includes a service provision functional unit 1f, an information processing unit 1e, a correspondence relation collecting functional unit 1c, a correspondence relation storage unit 1b, and a service request functional unit 1d. The information processing unit 1e has one or more objects, and provides control information to the service provision functional unit 1f by executing the object upon receiving a service request including a specific identifier. The correspondence relation collecting unit 1c collects a correspondence relation between the specific identifier of the object and address information of the equipment 1 from the equipment 1. The correspondence relation storage unit 1b stores the correspondence relation between the specific identifier and the address information, which is collected by the correspondence relation collecting unit 1c. While the address information corresponding to the specific identifier used for the service request is stored in the correspondence relation storage unit 1b, the service request functional unit 1d makes the service request on the basis of the address information. As a result, a resource necessary for communication by the use of association between the equipment 1 and the specific identifier can be reduced.

12 Claims, 9 Drawing Sheets

U.S. PATENT DOCUMENTS

2004/0174874 A1* 9/2004 Saito et al. .................. 370/389
2007/0097993 A1* 5/2007 Bojahra et al. ............... 370/401
2008/0263130 A1* 10/2008 Michalowitz et al. ........ 709/202

FOREIGN PATENT DOCUMENTS

| JP | 2004-021526 A | 1/2004 |
| JP | 2005-149456 A | 6/2005 |

OTHER PUBLICATIONS

Notification of Reasons for Rufusal, dated Aug. 28, 2012, issued in corresponding Japanese Patent Application No. 2007-220295, dated Aug. 28, 2012.

* cited by examiner

Fig. 3A

| specific identifier | address information |
|---|---|
| specific identifier 1 | address information 1 |
| specific identifier 2 | address information 1 |
| specific identifier 3 | address information 1 |
| specific identifier 4 | address information 2 |
| specific identifier 5 | address information 2 |
| specific identifier 6 | address information 2 |
| specific identifier 7 | address information 2 |
| specific identifier 8 | address information 3 |
| specific identifier 9 | address information 3 |
| specific identifier 10 | address information 3 |

Fig. 3B

| OID | address information |
|---|---|
| OID 1 | address information 1 |
| OID 2 | address information 2 |
| OID 3 | address information 3 |
| OID 4 | address information 4 |
| OID 5 | address information 5 |
| OID 6 | address information 6 |
| OID 7 | address information 7 |
| OID 8 | address information 7 |
| OID 9 | address information 8 |
| OID 10 | address information 8 |

Fig. 3C

| OID | IID | address information |
|---|---|---|
| OID 1 | * | address information 1 |
| OID 1 | IID 2 | address information 2 |
| OID 2 | * | address information 3 |
| OID 3 | * | address information 4 |
| OID 4 | * | address information 5 |
| OID 5 | * | address information 6 |
| OID 5 | IID 2 | address information 7 |
| OID 5 | IID 3 | address information 7 |
| OID 6 | * | address information 8 |
| OID 17 | * | address information 8 |

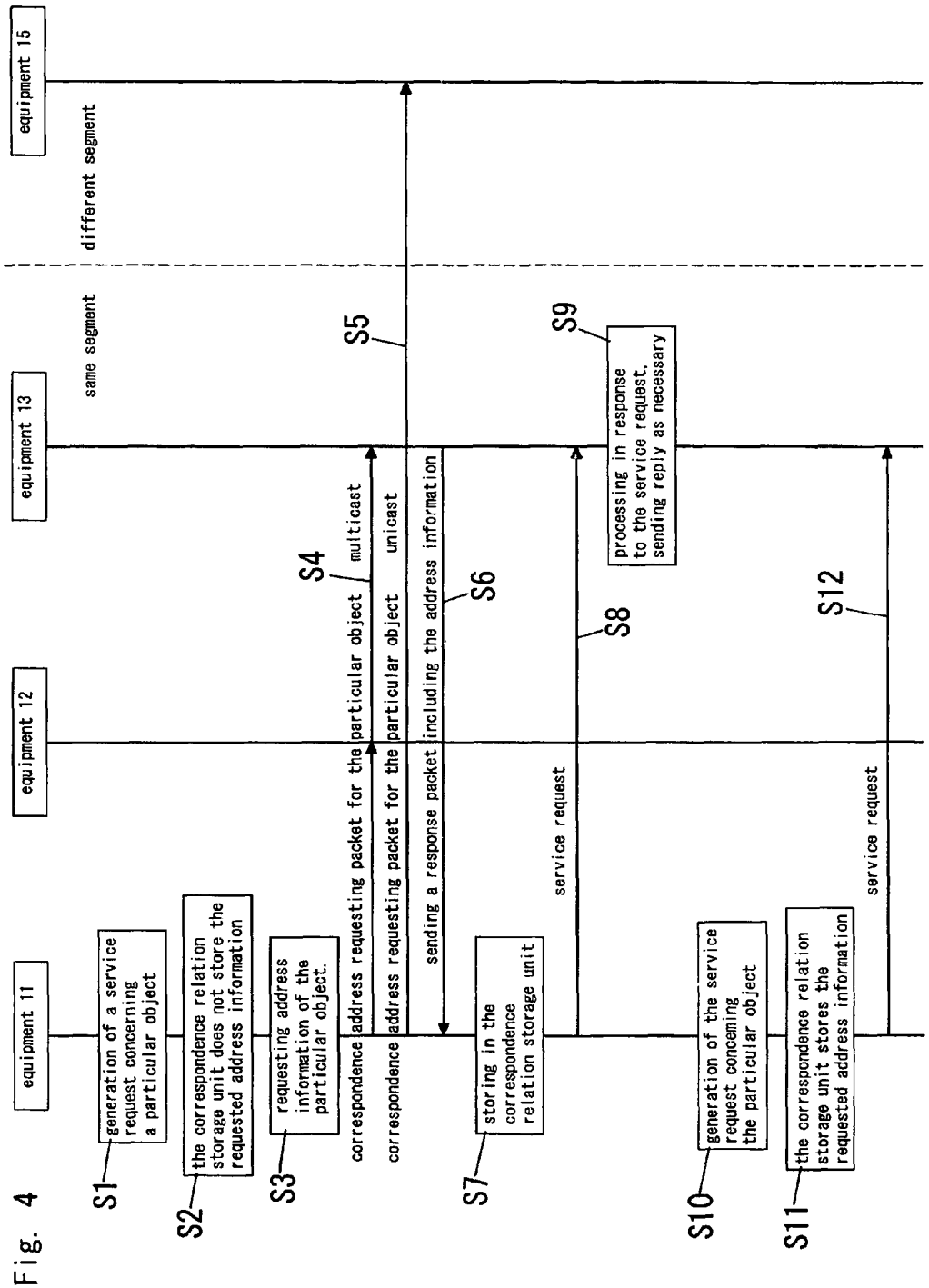

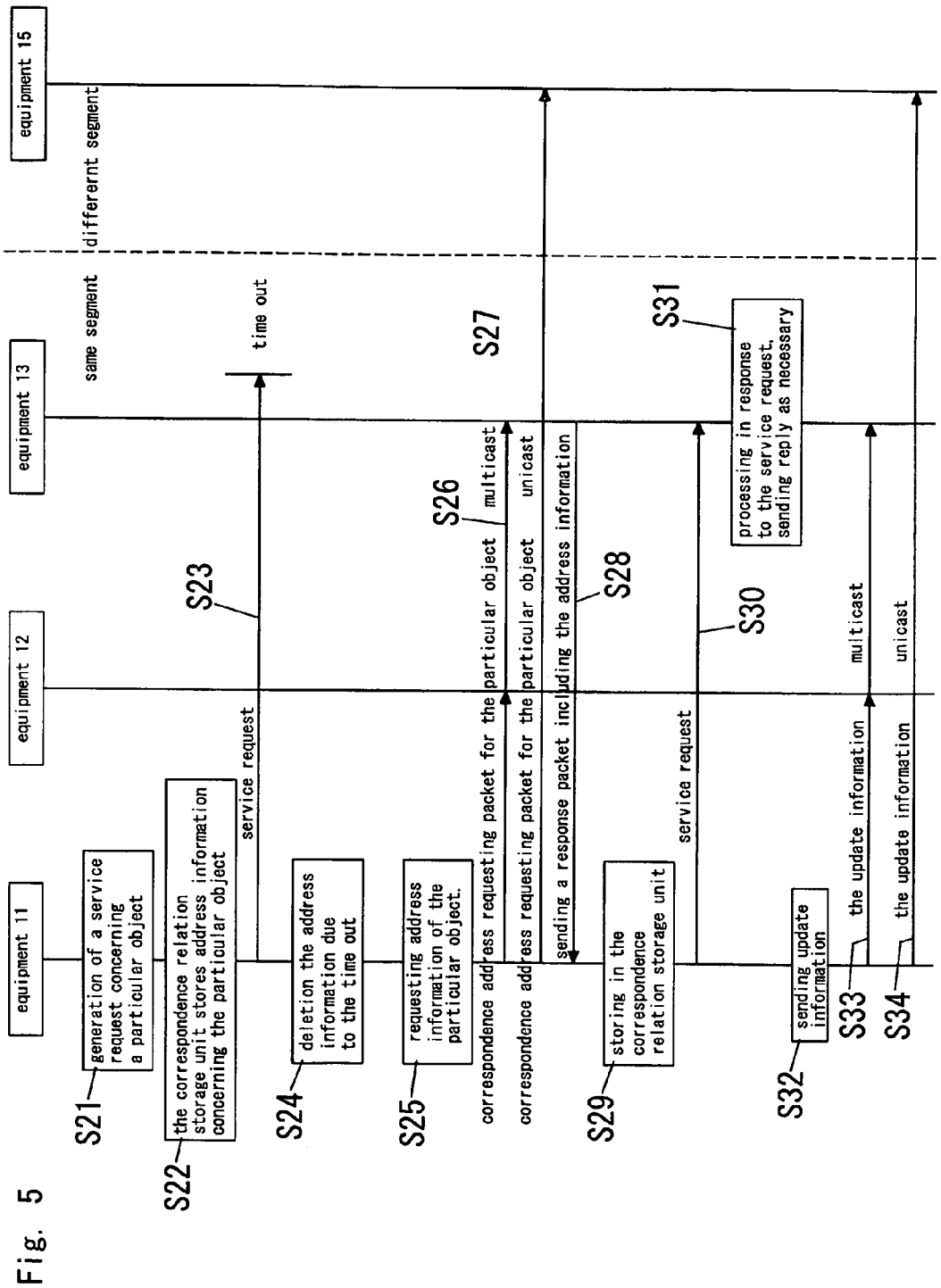

NETWORK SYSTEM ESTABLISHING COMMUNICATION BY USE OF CONNECTIONLESS PROTOCOL

CROSS-REFERENCE TO RELATED APPLICATION

This application is the U.S. national phase, pursuant to 35 U.S.C. §371, of International Application No. PCT/JP2008/065289, filed on Aug. 27, 2008, which claims the benefit of Japanese Application Ser. No. 2007-220295, filed Aug. 27, 2007, the disclosure of which applications are incorporated herein in their entireties by this reference.

TECHNICAL FIELD

The present invention is directed to a network system which establishes communication by the use of a connectionless protocol.

BACKGROUND ART

Previously, there is a network system where a plurality of equipment which provides various services is connected to each other via a network. For example, above mentioned network system is disclosed in Japanese Patent Publication JP 9-139742 A. Above mentioned equipment is, such as, a lighting device which provides a lighting control or a lighting monitoring as services, a air conditioner which provides an air conditioning control or an air conditioning monitoring as services, and a locking device which provides a locking control or a locking monitoring as services.

Each of the equipment has one or more objects for executing each service. Each of the equipment executes the object upon receiving a service request (an execution request) with a specific identifier which is assigned to each of the objects, thereby performing an operation corresponding to each service.

In the above mentioned network system, one equipment sends the service request to the other equipment when an event occurs, and a client terminal connected to the network sends the service request to a particular equipment. Above mentioned service request is sent on the basis of a correspondence relation between each of the equipment and the specific identifier assigned to the object which each of the equipment have. That is, the equipment and the client terminal, which make the service request, have the particular equipment execute a particular service with reference to the correspondence relation between the equipment and the specific identifier.

Establishing communication by the use of the connection protocol in such network system enables addition or deletion of the terminal, and communication control or management reflecting address modification, because a gateway always recognizes address information or connection information of all terminals.

However, when the equipment is associated with the specific identifier by the use of the connection information of the connection protocol, each of the terminals should establish a connection (a path to the other terminal) before communication, and the gateway should maintain the connection to all of the terminals connected thereto. Such communication requires excess resources.

By contrast, using a connectionless communication reduces resources necessary for communication. However, it is difficult for the connectionless communication to make addition or deletion of the terminal, and communication control or management reflecting address modification. The connectionless communication is improper to communication using the association between the equipment and the specific identifier.

DISCLOSURE OF INVENTION

In view of the above problem, the purpose of the present invention is to provide a network system which is capable of reducing resources necessary for communication by the use of association between the equipment and the specific identifier.

The network system in accordance with the present invention has a plurality of service provision terminals having an assigned unique address and being connected to a network, a service request terminal connected to the network, and a storage means connected to the network. Each of the service provision terminals and the service request terminal are configured to establish communication with each other by the use of a connectionless protocol. Besides, the service request terminal and the storage means may be unified or separated.

The each of the service provision terminals has an information processing unit and a service provision functional unit. The information processing unit has objects which are programs used for requesting the service provision functional unit to provide its service. The object has one or more control functions for requesting the service provision functional unit to provide the service. The object is given a specific identifier in association with the control function. The information processing unit is configured to, upon receiving a service request including the specific identifier, execute the control function indicated by the specific identifier included in the received service request. The service provision functional unit is configured to provide the service when the information processing unit executes the control function.

The storage means has a storage unit storing a correspondence relation between the specific identifier of the object in the each of the service provision terminals and the address information of the service provision terminals.

The service request terminal has a service request functional unit configured to send the service request to the each of the service provision terminals. The service request functional unit is configured to send the service request including the specific identifier to the service provision terminal having the address information corresponding to the specific identifier used for the service request with reference to the correspondence relation stored in the storage unit.

The storage means has a collecting functional unit configured to periodically receive the address information together with the specific identifier of the object from the each of the service provision terminals. The collecting functional unit is configured to periodically update the correspondence relation stored in the storage unit with reference to the received specific identifier and address information.

Accordingly, the present invention is capable of associating the service provision terminal with the specific identifier, without maintaining the connection. As a result, the present invention is capable of reducing resources necessary for communication used for association between the equipment and the specific identifier.

Preferably, the collecting functional unit is configured to periodically send a notice request to the each of the service provision terminals. In this instance, the each of the service provision terminals is configured to, upon receiving the notice request, notify the storage means of the address information together with the specific identifier of the object. The collecting functional unit is configured to collect both the address information and specific identifier of the object of which the each of the service provision terminals notifies the storage means, and to periodically update the correspondence relation stored in the storage unit.

According to this modification, the correspondence relation stored in the storage unit can be updated to the latest one. Therefore, occurrence of an error can be reduced at the time of requesting the service.

Preferably, the each of the service provision terminals is configured to periodically notify the storage means of the address information together with the specific identifier of the object. In this instance, the collecting functional unit is configured to acquire both the address information and specific identifier of the object of which the each of the service provision terminals notifies the storage means, and to update the correspondence relation stored in the storage unit.

According to this modification, the correspondence relation stored in the storage unit can be updated to the latest one, even when the storage means having the storage unit does not actively execute update-processing. Therefore, the network system can reduce occurrence of the error at the time of requesting the service.

Preferably, the each of the service provision terminals is configured to notify the storage means of the specific identifier together with the address information when activated. In this instance, the collecting functional unit is configured to acquire both the address information and specific identifier of the object of which the each of the service provision terminals notifies the storage means, and to update the correspondence relation stored in the storage unit.

According to this modification, when the new service provision terminal is added to the network, information about the new service provision terminal is added to the correspondence relation stored in the storage unit, even when the existing storage means does not execute particular processing. Therefore, the network system can reduce occurrence of the error at the time of requesting the service.

More preferably, the collecting functional unit is configured to collect the specific identifier of the object together with the address information from the service provision terminal having the address information not stored in the storage unit, and to store the correspondence relation between collected the specific identifier and the address information in the storage unit, when the address information corresponding to the specific identifier used for the service request is not stored in the storage unit, also when the service request functional unit sends the service request to the service provision terminal.

According to this modification, the storage means can obtain the correspondence relation not stored in the storage unit at once when needed. Therefore, real-time performance can be improved.

More preferably, the collecting functional unit is configured to, when the service request functional unit fails to access the service provision terminal to which the service request functional unit sends the service request on the basis of the address information stored in the storage unit, delete the correspondence relation including the address information used by the service request functional unit for access to the service provision terminal, and to collect the specific identifier together with the address information from the service provision terminal to which the service request functional unit tries to access, and to store the correspondence relation between collected the specific identifier and the address information in the storage unit.

According to this modification, the storage means can obtain the latest correspondence relation at once, even when the error occurs at the time of requesting the service because of the correspondence relation changed by replacement of the service provision terminal.

More preferably, the network system has a plurality of the storage means, and each of the storage means each is configured to, when the correspondence relation stored in the storage unit is changed, send a notification indicating the changed correspondence relation. In this instance, the storage means is configured to update the correspondence relation stored in the storage unit to the changed correspondence relation upon receiving the notification.

According to this modification, all of the storage means in the network system can share change information of the correspondence relation, by means of sending the notification indicating the change information of the correspondence relation. When one storage means updates the correspondence relation, the other storage means can update the correspondence relation in the same manner. Therefore, the network system can reduce occurrence of the error at the time of requesting the service.

More preferably, the network has a plurality of segments. The collecting functional unit is configured to establish a multicast communication to access the service provision terminal on the same segment when the collecting functional unit collects the correspondence relation from the service provision terminal on the same segment. The collecting functional unit is configured to establish a unicast communication to access the service provision terminal on the different segment, when the collecting functional unit collects the correspondence relation from the service provision terminal on the different segment.

In this modification, the network system having the plurality of segments and establishing multicast communication can also benefit from the present invention.

More preferably, the storage means is configured to delete from the storage unit the correspondence relation including the address information which is not used for a certain period after used in the latest communication.

According to this modification, low accuracy information, which is not used for a certain period after used in the latest communication, is not used. Therefore, it is prevented that the use of the old correspondence relation causes the error.

More preferably, the specific identifier has an object unique identifier peculiarly assigned to the object, and an interface identifier assigned to the control function of the object. The storage unit is configured to store the corresponding relation in which the different address information is assigned to the different specific identifier.

According to this modification, the correspondence relation between collected specific identifier and address information is stored without modification, storing processing can become easy.

As another modification, the specific identifier has an object unique identifier peculiarly assigned to the object, and an interface identifier assigned to the control function of the object. The storage unit is configured to store the corresponding relation indicating that the different address information is assigned to different the object unique identifier.

According to this modification, the storage capacity of the storage unit can be reduced.

Further, as another modification, the specific identifier has an object unique identifier assigned to the object, and at least one interface identifier assigned to the control function of the object. The storage unit is configured to store the correspondence relation in which the address information is alone assigned to the object unique identifier, when one of the object unique identifier corresponds to only one of the address information. the storage unit is configured to store the correspondence relation including the address information having the largest number of the corresponded interface identifier, while assigning the address information alone to the object unique identifier, and to store the correspondence relation including the address information not having the largest number of the corresponded interface identifier, while assigning both the address information and interface identifier to the object unique identifier, when one of the object unique identifier corresponds to a plurality of the address information.

According to this modification, the storage capacity of the storage unit can be reduced, and the same object unique identifier can be assigned to the plurality of the object.

BRIEF DESCRIPTION OF DRAWINGS

FIG. 3A is an example of a correspondence relation, FIG. 3B is an example of a correspondence relation, FIG. 3C is an example of a correspondence relation, FIG. 4 is a diagram illustrating an operational sequence of above mentioned network system, FIG. 5 is a diagram illustrating an operational sequence of a network system in accordance with 2nd embodiment of the present invention.

BEST MODE FOR CARRYING OUT THE INVENTION

Referring to attached drawings, a network system in accordance with a preferred embodiment of the present invention is explained below.

1st Embodiment

Figure 1:
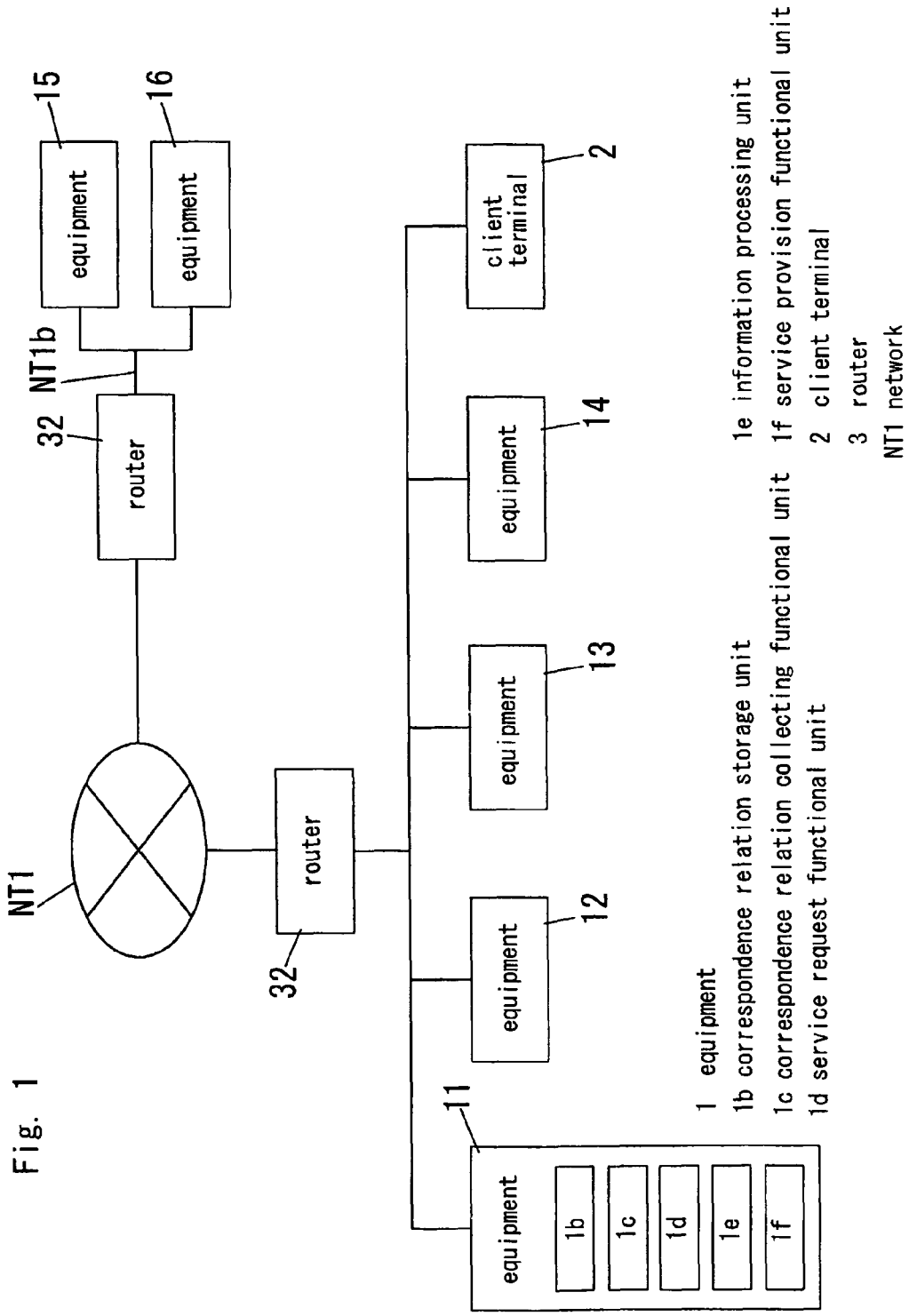
FIG. 1 is a diagram illustrating a configuration of a network system in accordance with 1st embodiment of the present invention.

FIG. 1 illustrates a configuration of a network system of the present embodiment. In the network system of the present embodiment, an equipment 1 (in FIG. 1, equipment 11 to 16 are shown as a plurality of the equipment 1) and a client terminal 2, as terminals (terminal devices), are connected to a network NT1 (a local network). The network NT1 has a multi-segment configuration which includes segments NT1*a* and NT1*b* connected each other through a router 3 (in FIG. 1, routers 31 and 32 are illustrated). The equipment 11 to 14 and the client terminal 2 belong to the segment NT1*a* connected to the router 31. The equipment 15 and 16 belong to the segment NT1*b* connected to the router 32. The equipment 11 to 16 and the client terminal 2 on the network NT1 establish communication with each other by the use of a so-called connectionless protocol. That is, the equipment 11 to 16 and the client terminal 2 on the network NT1 do not require establishing a connection (a path to the other terminal) to make communication with each other.

Besides, in the above mentioned network having the multi-segment configuration, communication in the same segment allows access by the use of multicast. However, communication between the different segments does not allow access by the use of multicast. Therefore, access by the use of unicast is used for communication between the different segments.

The equipment 1 is, such as, a lighting device which executes dimming control, and a lighting switch which executes on-off operation of the lighting and dimming operation. For example, the lighting device executes, such as, on-off control and dimmer control in response to operation of the lighting switch. Shown in FIG. 2A, the equipment 1 has a communicating unit 1*a*, a correspondence relation storage unit 1*b*, a correspondence relation collecting functional unit 1*c*, a service request functional unit 1*d*, an information processing unit 1*e*, and a service provision functional unit 1*f*.

The communicating unit 1*a* stores address information peculiar to each of the equipment 1. The communicating unit 1*a* establishes network communication by the use of the connectionless protocol with reference to the address information. This address information is, such as, an IP address, and an MAC address used for communication (for example, low-speed leased circuit communication).

The service provision functional unit 1*f* is a control target object provided according to a service which each of the equipment 1 provides. When the equipment 1 is the lighting device, above mentioned service provision functional unit 1*f* is a lighting means which controls lighting, extinction, and illumination of lighting loads. When the equipment 1 is the lighting switch, the service provision functional unit 1*f* is a signal processing means which sends manual control information in response to switching.

In the information processing unit 1*e*, a software module (hereinafter referred to as MOS (Micro Object Server)) including objects is incorporated, on the purpose of realization of object server function in the network system in accordance with the present embodiment. Above mentioned information processing unit 1*e* executes processing for providing a function used for directing (controlling) a operation of the service provision functional unit 1*f*, processing for obtaining variable number indicating a current state of the service provision functional unit 1*f*, and further processing for obtaining event information indicative of occurrence of state variation of the service provision functional unit 1*f*.

The MOS of each of the equipment 1 constructing the network system in accordance with the present embodiment includes one or more objects used for executing a processing for providing services. Each of the objects has one or more input-output definitions (hereinafter referred to as interface) which define control information (variable numbers, functions, event information, and these combination) corresponding to the service provided by the service provision functional unit 1*f*. That is, each of the objects has one or more control functions which makes the service provision functional unit 1*f* provide its service. Each of the objects has a specific identifier [OID+IID] which constructed by an object unique identifier (hereinafter referred to as OID) and an interface identifier (hereinafter referred to as IID). The OID is an identifier peculiarly assigned to the object. The IID is an identifier peculiarly assigned to each of the interfaces (or each of the control functions) which the object has.

The information processing unit 1e, upon receiving a service request (an execution request) with the specific identifier, executes the object to which the received specific identifier is assigned, thereby giving control information to the service provision functional unit 1f.

Besides, the interfaces having the same definition corresponding to the provided service (namely, the interfaces where the same IID is assigned) can be assigned to a plurality of the objects. Moreover, when a service requires no designating particular equipment 1, the same OID can be assigned to a plurality of the equipment 1.

Moreover, the OSI seven-layer model is used for the protocol in the network system of the present embodiment. The application layer which is the highest layer of the OSI is a unique Object Access Protocol (OAP) which the MOS of the information processing unit 1e of the equipment 1 uses for the transmitting information (such as variable numbers, event information, and functions) to the other terminal or receiving information (such as variable numbers, event information, and functions) from the other terminal.

The correspondence relation collecting functional unit 1c collects the correspondence relation between the specific identifier of the object and the address information storing in the different equipment 1, from the different terminal via the network NT1.

The correspondence relation storage unit 1b stores the correspondence relation between the specific identifier and the address information of the different equipment 1 collected by the correspondence relation collecting unit 1c. Further, the correspondence relation storage unit 1b stores the correspondence relation between own specific identifier and address information.

The service request functional unit 1d sends the service request to the other equipment 1 by the use of the specific identifier, with reference to the correspondence relation (the correspondence relation between the specific identifier and the address information) stored in the correspondence relation storage unit 1b.

Now, the client terminal 2 configures an integrated controller. The integrated controller can acquire the manipulation information of the lighting switches on the network, and control the lighting device on the network. FIG. 2B illustrates that the client terminal 2 has a communication unit 2a, a correspondence relation storage unit 2b, a correspondence relation collecting functional unit 2c, and a service request functional unit 2d.

The communicating unit 2a stores address information peculiar to each of the client terminals 2. The communicating unit 2a establishes network communication using the connectionless protocol with reference to the address information stored therein.

The correspondence relation collecting functional unit 2c collects the correspondence relation between the specific identifier of the object and the address information storing in the other equipment 1, from the other terminal via the network NT1.

The correspondence relation storage unit 2b stores the correspondence relation between the specific identifier and the address information of the equipment 1 collected by the correspondence relation collecting function device 2c.

The service request functional unit 2d sends the service request to the other equipment 1 by the use of the specific identifier, with reference to the correspondence relation (the correspondence relation between the specific identifier and the address information) stored in the correspondence relation storage unit 2b.

FIGS. 3A, 3B, and 3C illustrate correspondence relation tables TBa, TBb, and TBc respectively as a configuration example of a correspondence relation table TB between the specific identifier and the address information stored in the correspondence relation storage units 1b and 2b. The network system of the present embodiment uses any one of the tables TBa, TBb, and TBb as the correspondence relation table TB.

The correspondence relation table TBa of the FIG. 3A stores a combination of the specific identifier [OID+IID] and the address information of the equipment 1 having the same specific identifier. Therefore, using the correspondence relation table TBa eases storing processing because the correspondence relation table TBa stores the correspondence relation between the specific identifier and the address information collected by the correspondence relation collecting functional units 1c and 2c without any modification.

The correspondence relation table TBb of the FIG. 3C stores a relation between the object unique identifier [OID] and the address information of the equipment 1 having the same object identifier. In this instance, the correspondence relation table TBb may store the OID without any IID, even if the one OID has a plurality of the IIDs. But, it is impossible to assign the same OID to a plurality of the equipment 1.

The correspondence relation table TBc of FIG. 3C stores the object unique identifier [OID] in combination with the address information of the equipment 1 having the same OID. In order to support an instance where the same OID is assigned to a plurality of equipments 1, it is configured to, when there is already stored a combination of the OID and the address information and when there is a need of storing a new combination of the same OID but different address information, use the specific identifier [OID+IID] in combination with the address information of the equipment 1 having the same specific identifier, and store such combination as the new combination. Further, when there is a plurality of the combinations having the same OID but different address information, it is made to find out certain combinations having a maximum number of IID given to the address information so that thus found combinations are stored without the IID ("•" in FIG. 3C), i.e., in a simple format of the OID and the address information, while the remaining combination are stored in a format of the specific identifier [OID+IID] and the address information.

For example, FIG. 3C shows OID5 to which the two address information 6 and 7 are assigned. In the equipment 1 having the address information 6, three or more IIDs (such as, IID1, IID4, IID5, and IID6) are combined with OID5. In the equipment 1 having the address information 7, two IIDs (IID2 and IID3) are combined with OID5. As mentioned above, the number of the IIDs (three or more) belonging to the address information 6 are greater than the number of the IIDs (two) belonging to the address information 7. Therefore, the combination of OID5 and the address information 6 is stored without IIDs. The combination of OID5 and the address information 7 is stored with including IIDs.

Thus, the use of the correspondence relation table TBc makes it possible to assign the same OID to a plurality of the equipments 1. Moreover, it is possible to save memory storage capacity with the above scheme of storing the combinations in the simple format of [OID+address information] for such combinations which have the same OID but different address information and which have the maximum number of IIDs, while storing the combination in the format of [OID+IID+address information] for such combination which has less number of the IID. For this purpose, it is configured to save the number of IIDs respectively for the combinations stored in the format of [OID+address information], and the combinations stored in the format of [OID+IID+address information]. When the number of IIDs for the combinations stored in the format of [OID+IID+address information] is greater than the number of IIDs for the combinations stored in the format of [OID+address information], the current combinations stored in the simple format of [OID+address information] is rewritten and stored in the format of [OID+IID+address information], while deleting the [IIDs] from the combinations stored in the format of [OID+IID+address information] to rewrite and store such combination in the format of [OID+address information]. Thus, the combinations increasing to have the maximum number of IIDs are rewritten in the simple format of [OID+address information] to thereby optimize the memory storage area.

FIG. 4 illustrates a sequence in the network system of the present embodiment. The sequence indicates that the equipment updates information (the correspondence relation table TB) stored in the correspondence relation storage unit 1b of the equipment 1, and sends the service request. Besides, FIG. 4 shows the equipment 12, 13, and 15. The equipment 12 and 13 belong to the segment identical to the segment to which the equipment 1 belongs. The equipment 15 belongs to the segment different from the segment to which the equipment 1 belongs. However, whole system of FIG. 4 is identical to that of FIG. 1.

First, when the service request (the service request by the use of the particular specific identifier) is generated in the equipment 11 (S1), the service request functional unit 1d of the equipment 11 reference the correspondence relation stored in the correspondence relation storage unit 1b. While the address information corresponding to the particular specific identifier is stored, the service request functional unit 1d sends the service request including the particular specific identifier (specific identifier correspondence service request) to the equipment indicated by the address information corresponding to the particular specific identifier.

However, when the address information corresponding to the particular specific identifier is not stored in the correspondence relation storage unit 1b (S2), the correspondence relation collecting functional unit 1c requests the equipment 12 to 16 to send the address information corresponding to the particular specific identifier (S3). The correspondence relation collecting functional unit 1c establishes the multicast communication to send a correspondence address request packet to the equipment 12 to 14 connected to the segment identical to the segment to which the equipment 11 is connected (S4). Meanwhile, the correspondence relation collecting functional unit 1c establishes the unicast communication to send the correspondence address request packet to the equipment 15 and 16 connected to the segment different from the segment to which the equipment 11 is connected (S5). The equipment 13 having a particular object sends a response packet including the own address information to the equipment 11 (S6).

When the equipment 11 receives the response packet, the correspondence relation collecting functional unit 1c associates the address information of the equipment 13 with the particular specific identifier and stores it in the correspondence relation storage unit 1b. Thereby, the correspondence relation collecting functional unit 1c updates the correspondence relation table TB stored in the correspondence relation storage unit 1b (S7). Accordingly, the equipment 1 can obtain the correspondence relation not stored in the correspondence relation storage unit 1b immediately when needed. Therefore, real-time performance can be improved.

Now, it is assumed that the correspondence relation table TBa shown in FIG. 3A is used as the correspondence relation table TB. Confirmation of the correspondence relation at the time (S1) of generation of the service is made by searching the correspondence relation table TBa for the address information corresponding to the specific identifier [OID+IID] of the particular object. Meanwhile, upon receiving the response packet (S6), the correspondence relation collecting functional unit 1c associates the address information included in the response packet with the particular specific identifier [OID+IID], and stores it in the correspondence relation table TBa (S7).

It is assumed that the correspondence relation table TBb shown in FIG. 3B is used as the correspondence relation table TB. Confirmation of the correspondence relation at the time (S1) of generation of the service is made by searching the correspondence relation table TBb for the address information corresponding to the object unique identifier [OID] of the particular object. Meanwhile, upon receiving the response packet (S6), the correspondence relation collecting functional unit 1c connects the address information included in the response packet to the object unique identifier [OID] of the particular object, and stores it in the correspondence relation table TBa (S7).

It is assumed that the correspondence relation table TBc shown in FIG. 3C is used as the correspondence relation table TB. Confirmation of the correspondence relation at the time (S1) of generation of the service is made by searching the correspondence relation table TBc for the address information corresponding to the specific identifier [OID+IID] of the particular object. When the address information corresponding to the particular specific identifier [OID+IID] is not stored in the correspondence relation table TBc, the address information corresponding to the object unique identifier [OID] of the particular object is searched on the correspondence relation table TBc.

When the response packet is received (S6), and when information of the object unique identifier [OID] of the particular object is not stored in the correspondence relation table TBc, the correspondence relation collecting functional unit 1c associates the address information included in the response packet with the object unique identifier [OID] of the particular object, and stores it in the correspondence relation table TBc (S7). Meanwhile, when the response packet is received (S6), and when information of the object unique identifier [OID] of the particular object is stored in the correspondence relation table TBc, the correspondence relation collecting functional unit 1c judges whether or not the address information included in the response packet is associated with the object unique identifier of the particular object. When the address information included in the response packet is already associated with the object unique identifier of the particular object, the correspondence relation collecting functional unit 1c terminates processing without updating the correspondence relation table TBc. When the address information included in the response packet is not yet associated with the object unique identifier of the particular object, the correspondence relation collecting functional unit 1c associates the address information included in the response packet with the specific identifier [OID+IID] of the particular object, and stores it in the correspondence relation table TBc (S7).

The service request functional unit 1d sends the service request including the specific identifier to the equipment 13 with reference to the address information corresponding to the specific identifier in the updated correspondence relation storage unit 1b (S8).

Upon receiving the service request including the specific identifier, the information processing unit 1e of the equipment 13 provides control information to the service provision functional unit 1f by executing the object corresponding to the received specific identifier. Thereby, the information processing unit 1e of the equipment 13 operates the service provision functional unit 1f. If necessary, the equipment 13 sends an operation acknowledgement to the equipment 11.

Thereafter, the service request functional unit 1d of the equipment 11 can reference the address information corresponding to the particular specific identifier stored in the correspondence relation storage unit 1b, and sends the service request including the particular specific identifier to the equipment 13 (S10 to S12).

Further, the correspondence relation collecting functional unit 1c of the equipment 11 periodically collects a list indicative of the specific identifier of all of the objects owned by each of the equipment 1 together with the address information from all of the equipment 1. The equipment 11 sends notification request (identifier list and address sending request) to the equipment 12 to 14 belonging to the segment identical to the segment of the equipment 11 by establishing the multicast communication. By contrast, the equipment 11 sends the identifier list and address sending request to the equipment 15 belonging to the segment different from the segment of the equipment 11 by establishing the unicast communication. Upon receiving the identifier list and address sending request, each of the equipment 1 sends the list indicative of the specific identifier of all of the own objects together with the address information to the equipment 11. In the same manner as the equipment 11, the correspondence relation collecting functional unit 1c of the other equipment 1 and the correspondence relation collecting functional unit 2c of the client terminal 2 periodically collects the list indicative of the specific identifier of all of the objects owned by each of the equipment 1 together with the address information from all of the equipment 1.

As described above, the correspondence relation between the specific identifier owned by each of the equipment and the address information is made and updated, without maintaining the connection, while establishing network communication by the use of the connectionless protocol. Accordingly, resources necessary for communication by the use of the correspondence relation can be reduced. Further, since all of the terminals (the equipment 1 and the client terminal 2) have the correspondence relation storage units 1b and 2b respectively, all of the terminals establish flat communication with each other. Therefore, all of the terminals can flexibly respond to a requirement of the system.

Besides, above mentioned sequence exemplifies that the equipment 1 sends the service request and updates the correspondence relation table TB stored in the correspondence relation storage unit 1b. The client terminal 2 also can send the service request and update the correspondence relation table TB stored in the correspondence relation storage unit 2b.

In addition, storing only information related to the object being requested the service in the correspondence relation storage units 1b and 2b of the terminals (the equipment 1 and the client terminal 2) can minimize a storage capacity. However, the correspondence relation table TB may stores information directed to all of the objects owned by each of the terminals.

Further, in the present embodiment, the client terminal 2 is corresponding to the service request terminal and storage means of the present invention. Moreover, while one equipment 1 is corresponding to the service provision terminal of the present invention, the other equipment 1 is corresponding to the service request terminal and storage means of the present invention. For instance, while the equipment 11 acts as the service provision terminal of the present invention, the other equipment 12 to 16 are act as the service request terminal and storage means of the present invention.

2nd Embodiment

The network system in accordance with the present embodiment as well as the network system of the 1st embodiment includes components shown in FIG. 1 to FIG. 3. The network system of the present embodiment executes operation indicated by FIG. 5 in addition to operation of the network system of 1st embodiment.

First, when the service request (the service request by the use of the particular specific identifier) for requesting the particular object is generated in the equipment 11 (S21), the service request functional unit 1d of the equipment 11 reference the correspondence relation stored in the correspondence relation storage unit 1b. While the address information corresponding to the particular specific identifier is stored, the service request functional unit 1d sends the service request including the particular specific identifier (specific identifier correspondence service request) to the equipment indicated by the address information corresponding to the particular specific identifier.

However, when the target equipment 1 does not send the operation acknowledgement or fails to send the operation acknowledgement because of a communication error, the equipment 11 fails to receive the operation acknowledgement from the target equipment 1 within a predetermined period after sending the service request. In this instance, time-out occurs (that is, the equipment 11 fails to access to the target equipment). When the time-out occurs, the service request functional unit 1d of the equipment 11 deletes the information used for the service request from the correspondence relation storage unit 1b (S24). Accordingly, the equipment 11 can obtain the latest correspondence relation immediately, even when the time-out occurs at the time of requesting the service because of the correspondence relation changed by replacement of the service provision terminal. Besides, this processing is executed only for the service request requiring the target equipment 1 to send the operation acknowledgement.

The correspondence relation collecting functional unit 1c of the equipment 11 requests the equipment 12 to 16 to send the address information corresponding to the particular specific identifier (S25). The correspondence relation collecting functional unit 1c establishes the multicast communication to send a correspondence address request packet to the equipment 12 to 14 connected to the segment identical to the segment to which the equipment 11 is connected (S26). Meanwhile, the correspondence relation collecting functional unit 1c establishes the unicast communication to send the correspondence address request packet to the equipment 15 and 16 connected to the segment different from the segment to which the equipment 11 is connected (S27). The equipment 13 having a particular object sends the response packet including the own address information to the equipment 11 (S28).

When the equipment 11 receives the response packet, the correspondence relation collecting functional unit 1c associates the address information of the equipment 13 with the particular specific identifier and stores it in the correspondence relation storage unit 1b. Thereby, the correspondence relation collecting functional unit 1c updates the correspondence relation table TB stored in the correspondence relation storage unit 1b (S29).

The service request functional unit 1d of the equipment 11 sends the service request including the particular specific identifier to the equipment 13 with reference to the address information corresponding to the particular specific identifier and in the updated correspondence relation storage unit 1b (S30).

Upon receiving the service request including the specific identifier, the information processing unit 1e of the equipment 13 provides control information to the service provision functional unit 1f by executing the object corresponding to the received specific identifier. Thereby, the information processing unit 1e of the equipment 13 operates the service provision functional unit 1f. After that, the information processing unit 1e of the equipment 13 sends the operation acknowledgement to the equipment 11 from the equipment 13 (S31).

Further, the equipment 11 notifies the different terminals (the equipment 1 and client terminal 2) of update information of the correspondence relation storage unit 1b. Therefore, the correspondence relation collecting functional units 1c and 2c of all of the terminals in the network system collect the update information. Accordingly, all of the terminals can share modified information of the correspondence relation. The different terminals can update the correspondence relation in the same manner as the equipment 11 (S32). The update information is sent by the use of the multicast communication to the equipment 12 to 14 connected to the segment identical to the segment to which the equipment 11 is connected (S33). Meanwhile, the update information is sent by the use of the unicast communication to the equipment 15 and 16 connected to the segment different from the segment to which the equipment 11 is connected (S34).

Besides, above mentioned sequence exemplifies that the equipment 1 sends the service request and updates the correspondence relation table TB stored in the correspondence relation storage unit 1b. The client terminal 2 also can send the service request and update the correspondence relation table TB stored in the correspondence relation storage unit 2b.

As described above, the terminals (the equipment 1 and client terminal 2) having the correspondence relation storage units 1b and 2b respectively update the correspondence relation table TB as needed. In update processing, when the new correspondence relation is already stored, the terminals may terminate the update processing, or overwrite the existing correspondence relation. Furthermore, the update processing includes deletion of the correspondence relation.

3rd Embodiment

The network system in accordance with the present embodiment as well as the network system of the 1st embodiment includes components shown in FIG. 1 to FIG. 3. The network system of the present embodiment executes operation indicated by FIG. 6 in addition to operation of the network system of 1st embodiment.

First, it is assumed that the equipment 13 is added to the present network system. When the equipment 13 is activated (S41), the equipment 13 sends a list indicative of the specific identifier of all of the own objects together with the address information to the other terminals (the equipment 1 and client terminal 2) having respectively the correspondence relation storage units 1b and 2b (S42). This information (the list and the address information) is sent by the use of the multicast communication to the equipment 11, 12 and 14, and client terminal 2 connected to the segment identical to the segment to which the equipment 13 is connected (S43). Meanwhile, the same information is sent by the use of the unicast communication to the equipment 15 and 16 connected to the segment different from the segment to which the equipment 13 is connected (S44). Besides, the equipment 13 preliminarily stores information of the different terminals in the correspondence relation storage unit 1b.

The different terminals (the equipment 1 and client terminal 2) collect the address information and the specific identifier of the all of the object which the equipment 13 owns, by the correspondence relation collecting functional unit 1c, 2c. The different terminals store collected information in the correspondence relation storage unit 1b, 2b. Accordingly, information of the new added equipment 13 is reflected in the correspondence relation. Therefore, occurrence of the error at the time of requesting the service can be reduced.

Further, the correspondence relation collecting functional unit 1c, 2c of each of the terminals (the equipment 1 and client terminal 2), for example, the correspondence relation collecting unit 1c of the equipment 11 periodically collects the list indicative of the specific identifier of all of the objects owned by each of the terminals together with the address information (S46). The equipment 11 establishes the multicast communication to send identifier-list-and-address-sending-request (notification request) to the equipment 12 to 14 connected to the segment identical to the segment to which the equipment 11 connected (S47). Meanwhile, the equipment 11 establishes the unicast communication to send the identifier-list-and-address-sending-request to the equipment 15 and 16 connected to the segment different from the segment to which the equipment 11 is connected (S50). Upon receiving the identifier-list-and-address-sending-request, each of the terminals sends the list indicative of the specific identifier of all own objects together with the address information to the equipment 11 (S48, S49, S51).

After the equipment 11 collects the address information and the specific identifier of the all of the objects owned by the different equipment 12 to 16, the equipment 11 compares collected information with information stored in the correspondence relation storage unit 1b. When the collected information is different from the information stored in the correspondence relation storage unit 1b, the equipment 11 updates the information stored in the correspondence relation storage unit 1b to the collected information (S52). Therefore, the occurrence of the error at the time of requesting the service is reduced.

Concerning to information update of the correspondence relation storage unit 1b, when information related to the specific identifier not stored in the correspondence relation storage unit 1b is collected, collected information may be discarded. In this instance, the equipment 1 can store only information related to the service-requested object in the correspondence relation storage unit 1b. Alternatively, when information related to the specific identifier not stored in the correspondence relation storage unit 1b is collected, collected information may be stored in the correspondence relation storage unit 1b rather than discarded. In this instance, the equipment 1 can store information related to the all of the objects owned by each of the terminals on the network NT1.

Figure 6:
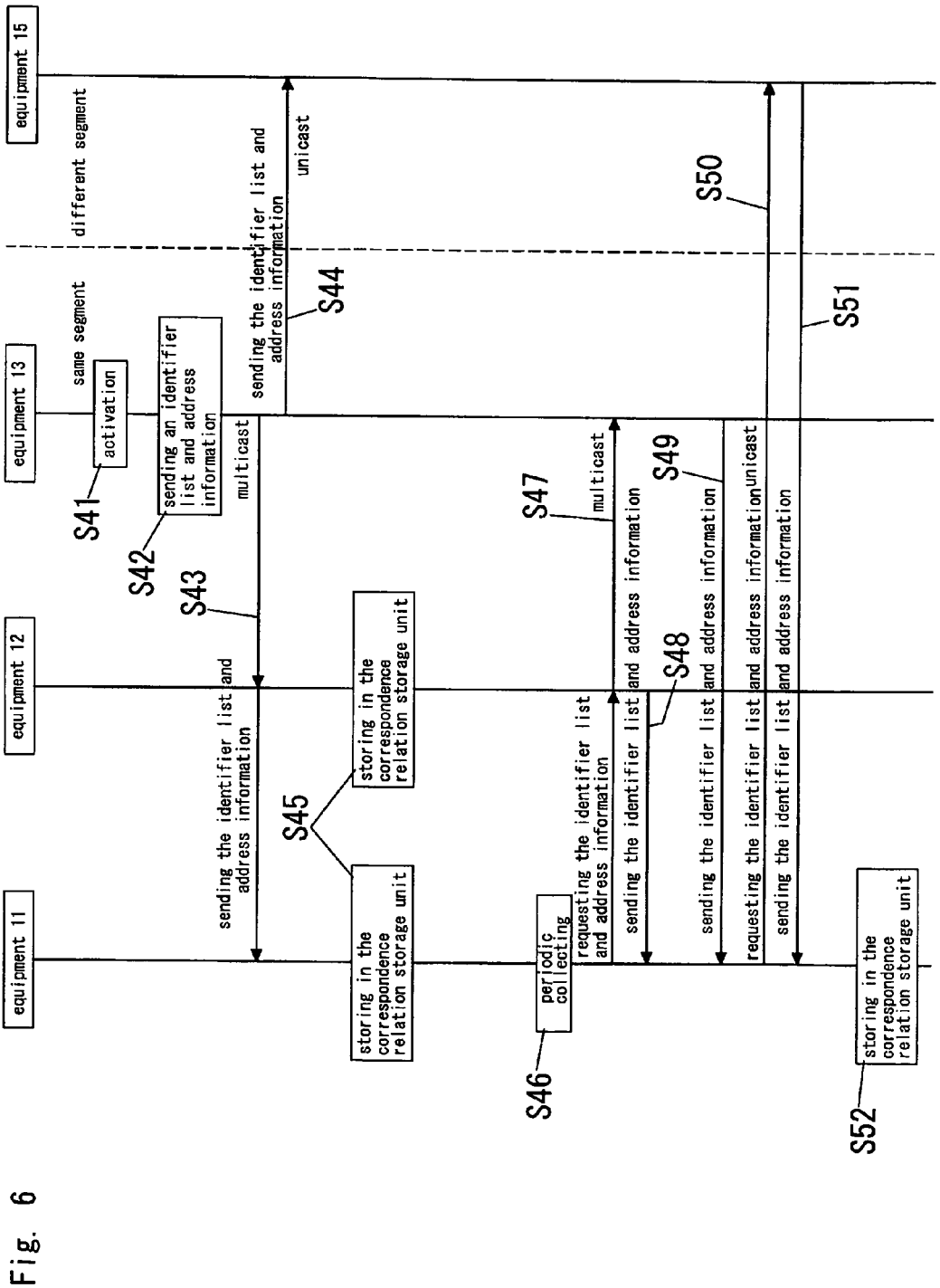
FIG. 6 is a diagram illustrating an operational sequence of a network system in accordance with 3rd embodiment of the present invention.

Besides, in FIG. 6, each of the terminals sends the identifier-list-and-address-sending-request, and each of the terminals which receives the identifier-list-and-address-sending-request sends own information. However, each of the equipment 1 may periodically send the address information and the specific identifier of the all of the own objects to the other terminals having the correspondence relation storage unit 1b, 2b, and the correspondence relation storage unit 1b, 2b of each of terminals (the equipment 1 and client terminal 2) may collect information sent by the equipment 1.

Furthermore, each of terminals (the equipment 1 and client terminal 2) connects information stored in the correspondence relation storage unit 1b, 2b to the latest used time (the latest time at which the information is used for network communication). Each of the terminals deletes the information which is not used for a certain period after the latest used time. Therefore, when the terminal attempts to send the service request including the deleted specific identifier, the terminal sends the correspondence address request packet once again, and collects the address information corresponding to the deleted specific identifier. Accordingly, low accuracy information, which is not used for a certain period after used in the latest communication, is not used. Therefore, it can be prevented that the use of the old correspondence relation causes the error. The terminals can send the service request on the basis of the latest information.

4th Embodiment

In the 1st to 3rd embodiments, all of the terminals (the equipment 1 and client terminal 2) have the correspondence relation storage units 1b and 2b respectively. However, in the network system in accordance with the present embodiment, representative equipment alone has the correspondence relation storage unit. The correspondence relation between the specific identifier and the address information is managed by the representative equipment. The other equipment 1 and the client terminal 2 are configured to store the address information of the representative equipment.

Figure 2A:
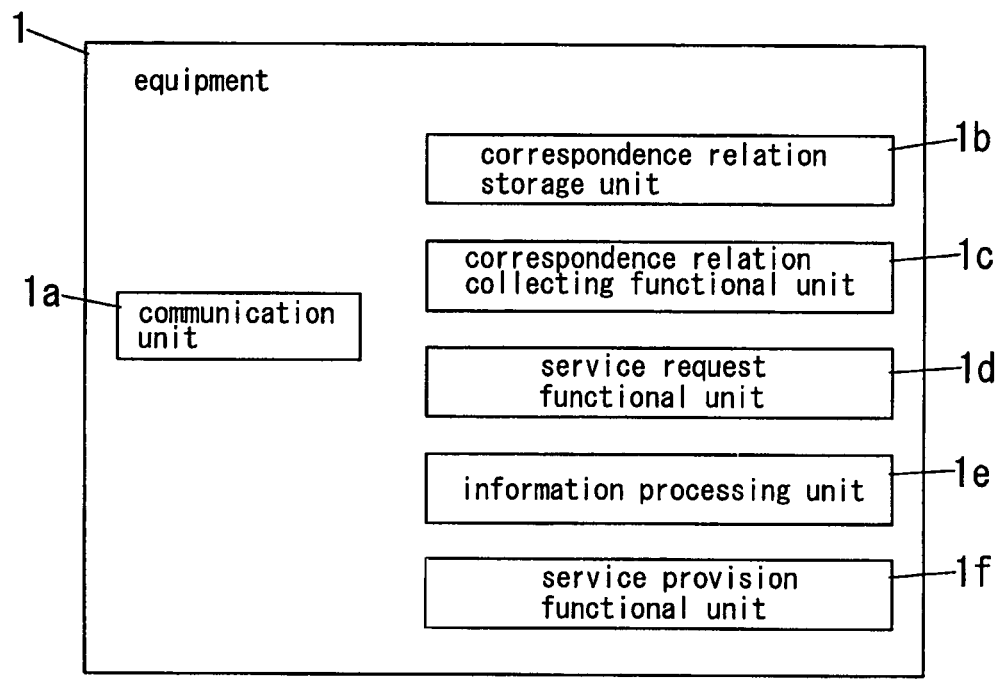
FIG. 2A is a diagram illustrating a configuration of equipment.
Figure 2B:
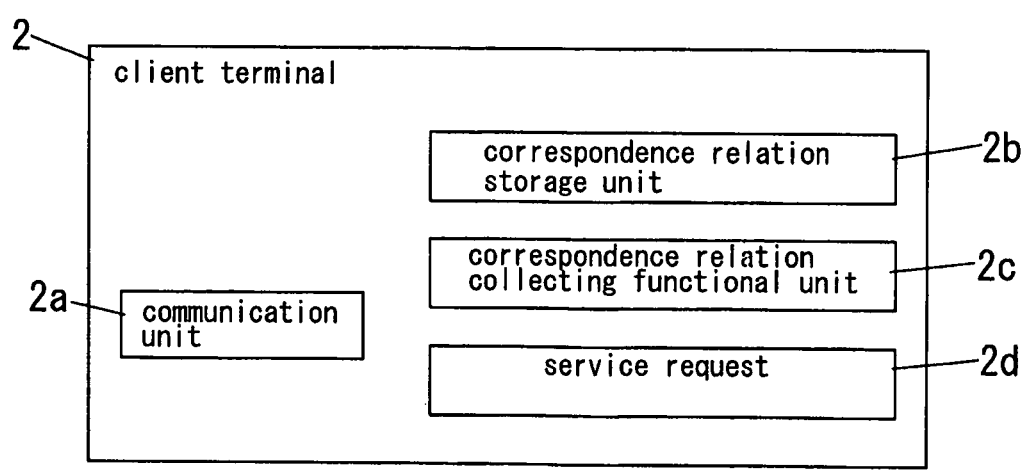
FIG. 2B is a diagram illustrating a configuration of a client terminal.

In the system configuration shown in FIG. 1, when it is assumed that the equipment 11 is the representative equipment, the equipment 11 has components shown in FIG. 2A. Then, explanation for the equipment 11 is omitted.

Figure 7A:
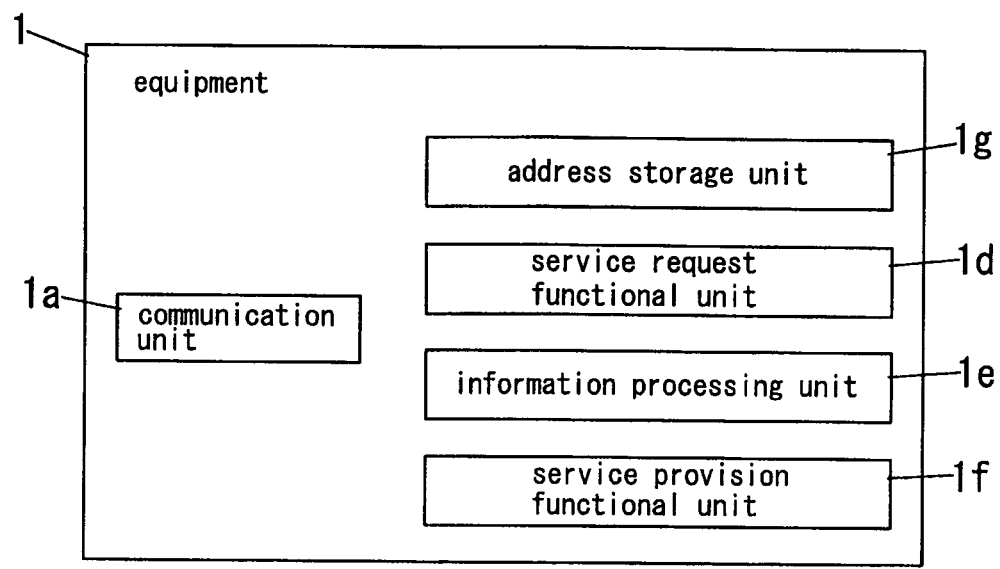
FIG. 7A is a diagram illustrating a configuration of an equipment of a network system in accordance with 4th embodiment of the present invention.

Each of the other equipment 12 to 16 has components shown in FIG. 7A, that is, the communication unit 1a, an address storage unit 1g, the service request functional unit 1d, the information processing unit 1e, and the service provision functional unit 1f. The address storage unit 1g stores the address information of the equipment 11 being the representative equipment.

Figure 7B:
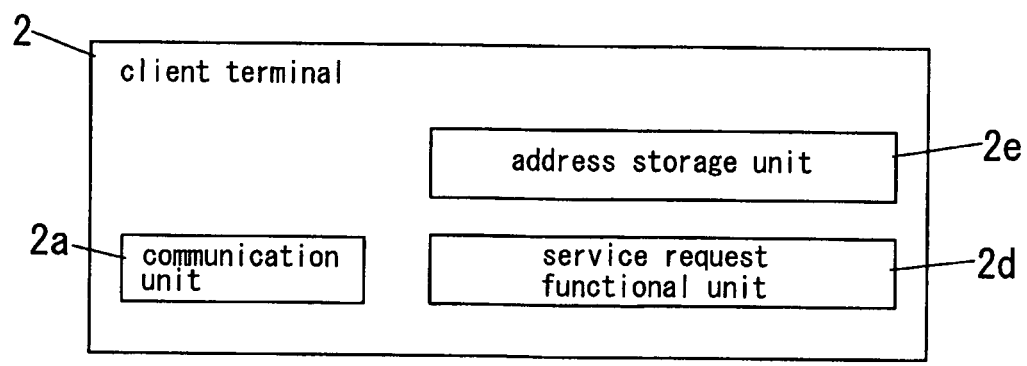
FIG. 7B is a diagram illustrating a configuration of a client terminal the network system in accordance with 4th embodiment of the present invention.

The client terminal 2 has components shown in FIG. 7B, that is, the communication unit 2a, the service request functional unit 2d, and an address storage unit 2e. The address storage unit 2e stores the address information of the equipment 11 being the representative equipment.

Figure 8:
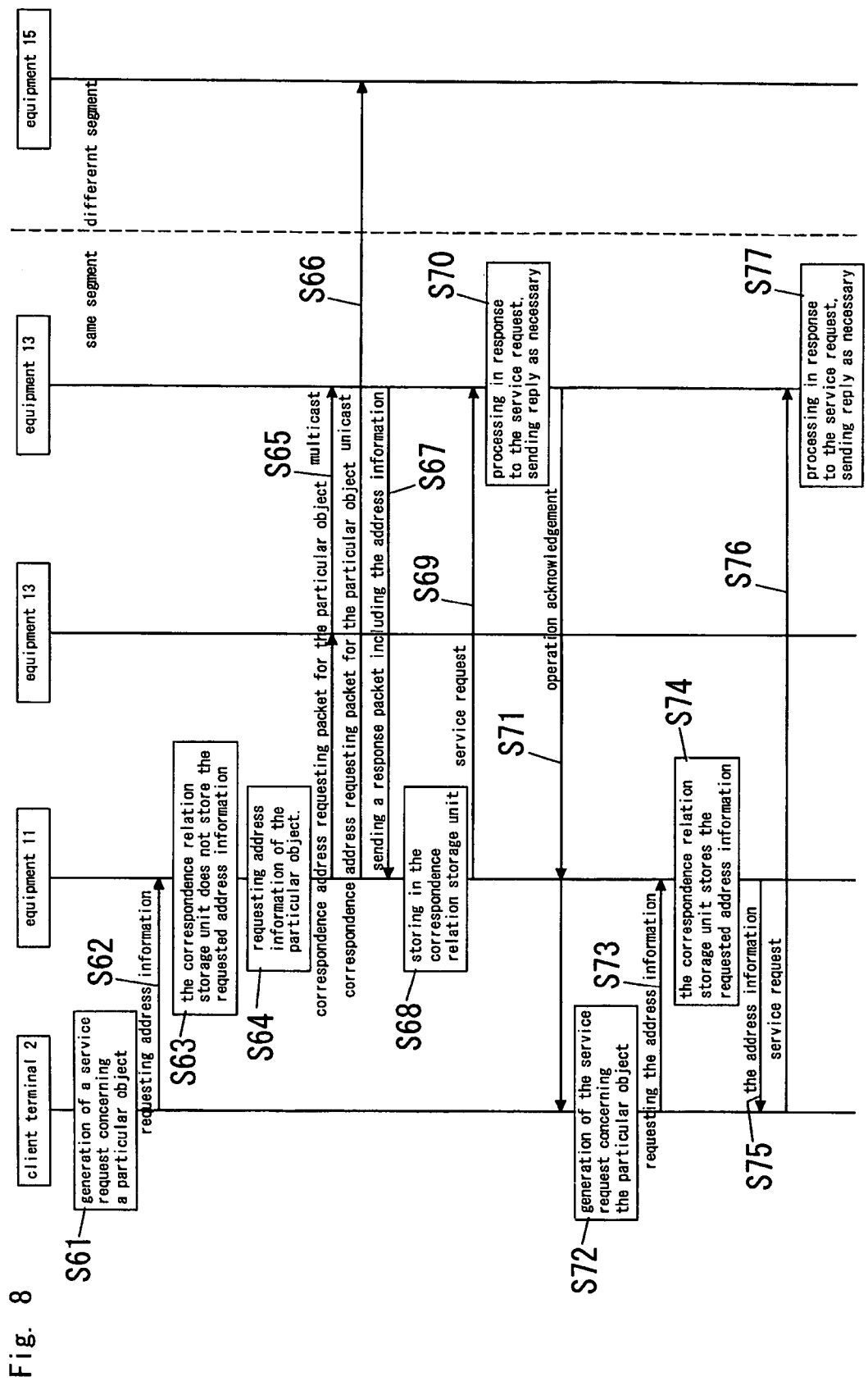
FIG. 8 is a diagram illustrating an operational sequence of the network system in accordance with 4th embodiment of the present invention.

FIG. 8 illustrates a sequence in the network system of the present embodiment. The sequence indicates that the equipment updates information (the correspondence relation table TB) stored in the correspondence relation storage unit 1b of the equipment 1, and the client terminal 2 sends the service request. Besides, FIG. 8 shows the equipment 12, 13, and 15. The equipment 12 and 13 belong to the segment identical to the segment to which the equipment 1 belongs. The equipment 15 belongs to the segment different from the segment to which the equipment 1 belongs. However, whole system of FIG. 8 is identical to that of FIG. 1.

First, when the service request related to the particular object (the service request including the particular specific identifier) is generated in the client terminal 2 (S61), the service request functional unit 2d of the client terminal 2 references the address storage unit 2e. The service request functional unit 2d requests the equipment 11 as the representative equipment to send the address information corresponding to the particular specific identifier (S62).

The equipment 11 references the correspondence relation storage unit 1b. When the address information corresponding to the particular specific identifier is not stored in the correspondence relation storage unit 1b (S63), the correspondence relation collecting functional unit 1c requests the equipment 12 to 16 to send the address information corresponding to the particular specific identifier (S64). In this instance, the correspondence relation collecting functional unit 1c establishes the multicast communication to send the correspondence address request packet to the equipment 12 to 14 connected to the segment identical to the segment to which the equipment 11 is connected (S65). Meanwhile, the correspondence relation collecting functional unit 1c establishes the unicast communication to send the correspondence address request packet to the equipment 15 and 16 connected to the segment different from the segment to which the equipment 11 is connected (S66). The equipment 13 having the particular object sends the response packet including the own address information to the equipment 11 (S67).

When the equipment 11 receives the response packet, the correspondence relation collecting functional unit 1c associates the address information of the equipment 13 with the particular specific identifier and stores it in the correspondence relation storage unit 1b. Thereby, the correspondence relation collecting functional unit 1c updates the correspondence relation table TB stored in the correspondence relation storage unit 1b (S68).

The service request functional unit 1d of the equipment 11 sends the service request including the particular specific identifier to the equipment 13 with reference to the address information corresponding to the particular specific identifier in the updated correspondence relation storage unit 1b (S69).

Upon receiving the service request including the specific identifier, the information processing unit 1e of the equipment 13 provides the control information to the service provision functional unit 1f by executing the object corresponding to the received specific identifier. Thereby, the information processing unit 1e of the equipment 13 operates the service provision functional unit 1f (S70). If necessary, the equipment 13 sends the operation acknowledgement to the client terminal 2 from the equipment 13 through the equipment 11.

Thereafter, when the service request related to the particular object (the service request including the particular specific identifier) is generated in the client terminal 2 (S72), the service request functional unit 2d requests the equipment 11 to send the address information corresponding to the particular specific identifier (S62). In this instance, the address information corresponding to the particular specific identifier is already stored in the correspondence relation storage unit 1b of the equipment 11.

Therefore, the equipment 11 sends the address information corresponding to the particular specific identifier to the client terminal 2 (S75). The client terminal 2 sends the service request including the particular specific identifier to the equipment 13 with reference to the received address information (S76). The information processing unit 1e of the equipment 13 activates the service provision functional unit 1f (S77).

Besides, in processing of S74 to S77, while the address information corresponding to the particular specific identifier is stored in the correspondence relation storage unit 1b of the equipment 11, the equipment 11 may directly send the service request to the equipment 13, and the equipment 13 may send the operation acknowledgement to the client terminal 2 through the equipment 11.

As described above, only the equipment 11 being the representative equipment has the correspondence relation storage unit, and the other equipment 1 and the client terminal 2 store the address information of the representative equipment. The correspondence relation between the specific identifier and the address information is managed by the representative equipment. Accordingly, a storage capacity of the other equipment 1 and the client terminal 2 can be reduced. Further, the other equipment 1 and the client terminal 2 can be made at a lower cost. Furthermore the correspondence relation can be easily to be configured, because the representative equipment alone has the correspondence relation.

Additionally, in the present embodiment, the client terminal 2 is corresponding to the service request terminal of the present invention. The equipment 11 being the representative equipment is corresponding to both the service provision terminal and the storage means of the present invention. The different equipment 12 to 16 is corresponding to the service provision terminal of the present invention.

5th Embodiment

Figure 9A:
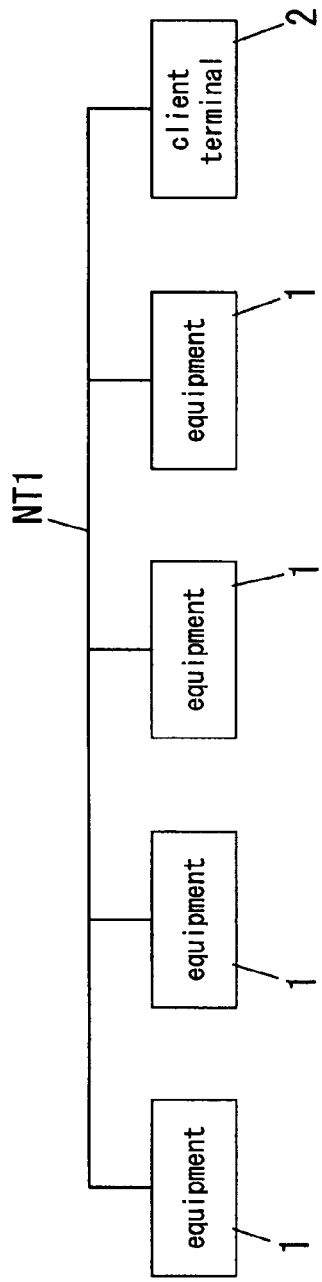
FIG. 9A is a diagram illustrating a configuration of a network system in accordance with 5th embodiment of the present invention.

In the 1st to 4th embodiments, as shown in FIG. 9A, the equipment 1 and the client terminal 2 are connected to the network (local network) NT1 using the connectionless protocol. The equipment 1 is, such as, the lighting device which executes dimming control, and the lighting switch which executes on-off operation of the lighting and dimming operation. For example, when the equipment 1 operates the lighting switch, the lighting device executes, such as, on-off control and dimmer control. The client terminal 2 is an integrated controller which can obtain operation information of the lighting switch included in the network system and control cooperatively the lighting device included in the network system.

Figure 9B:
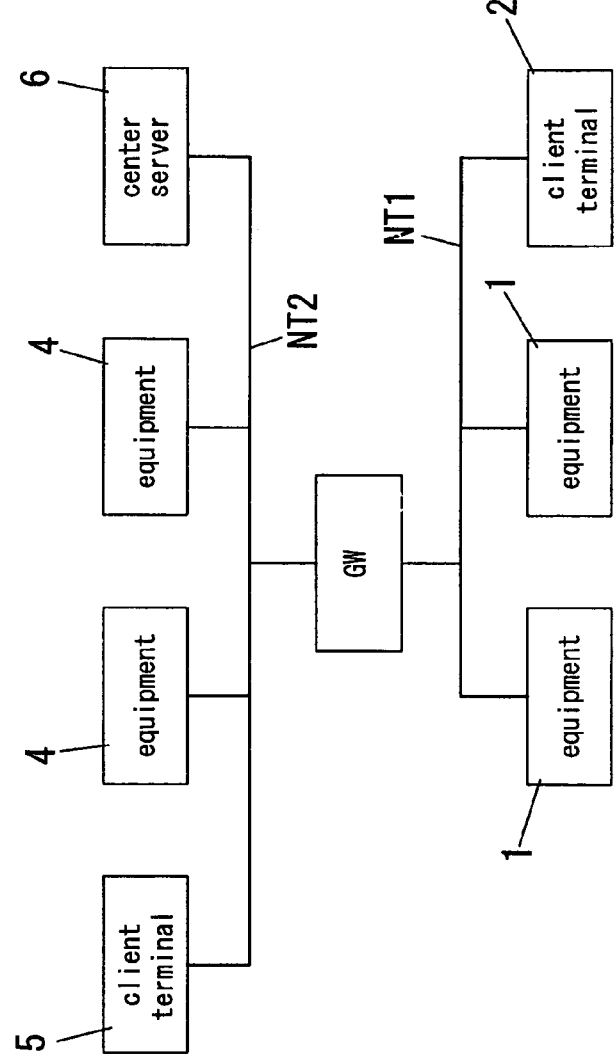
FIG. 9B is a diagram illustrating a configuration of the network system in accordance with 5th embodiment of the present invention.

The network system in accordance with the present embodiment, as shown in FIG. 9B, is a unitary system formed by connecting a network NT2 to the network NT1 similar to that of the 1st to 4th embodiments through a gateway GW and connecting equipment 4, a client terminal 5, and a center server 6 to the network NT2. Besides, each of the equipment 1 and 4, the client terminals 2 and 5, and the center server 6 is the terminal in accordance with the present embodiment.

In the network NT2, the terminals communicate with each other by the use of the connection protocol. That is, the network NT2 requires establishing a connection (a path to the other). In the connection protocol, the center server 6 has a function of below mentioned object access server (hereinafter called "OAS"). Each of equipment 4 and the client terminal 5 establishes the connection on the network NT2 by the use of the OAS. Thereby, communication based on connection information of the each of the terminal is available. In particular, when network NT2 is a system employing the internet protocol, the each of terminals establishes the connection by the use of TCP/IP.

Above mentioned OAS includes first software, second software, and third software. The first software is software which realizes a function as an object router used for hiding a connection method of the network. The second software is a wide variety of application software executed in order that the client terminal 5 receives the service provided by the equipment 4 by accessing input-output definition (hereinafter called "interface") of the object owned by the equipment 4. The third software is software realizing a service function which can be added, such as a protocol bridge service and a fire wall bridge service. The protocol bridge service is used for seamless connection to the network system by converting a protocol into a different protocol. The fire wall bridge service is used for passing through a fire wall by converting a protocol between the OASs into SOAP (Simple Object Access Protocol).

The equipment 4 is, such as, a remote control terminal used for remote-controlling a device, and a security terminal such as a locker. The equipment 4 gives an alarm through the center server 6, and controls the device through the center server 6.

The client terminal 5 is, for example, a personal computer being equipped with browsing software. The client terminal 5 communicates with the equipment 4 by accessing to the center server 6 by the use of HTTP.

The gateway GW stores both the correspondence relation table TB and the connection information. The correspondence relation is used in the network NT1 employing the connectionless protocol. The connection information is used for access to the network NT2 employing the connection protocol. The gateway GW enables access between the networks NT1 and NT2 by performing proper routing with reference to both the correspondence relation table TB and the connection information.

It is assumed that a user controls the equipment 1 connected to the network N1 by the use of the client terminal 5 connected to the network NT2. First, the user accesses to the center server 6 by the use of the browsing software (browsing function) of the client terminal 5. Then, the center server 6 communicates with the gateway GW through the connection. Thereafter, the gateway GW checks that a control target is connected to the network NT1, with reference to the correspondence relation table TB. The gateway GW uses the connectionless protocol to send a control packet to the equipment 1 being the control target.

It is assumed that the user controls the equipment 4 connected to the network N2 by the use of the client terminal 2 connected to the network NT1. First, the client terminal 2 sends a control packet to the gateway GW. Thereafter, the gateway GW converts the received control packet into the connection protocol, and sends it to the equipment 4 by the use of the connection protocol.

Besides, in the present embodiment, the gateway GW is corresponding to both the service request terminal and storage means of the present invention.

The embodiment described in the present description only shows an example of the present invention, gives no limitation about the scope of the present invention. The scope of the invention includes various changes and modifications made on the basis of claims or descriptions of the present invention.

The invention claimed is:

1. A network system comprising:
   a plurality of service provision terminals having an assigned unique address and being connected to a network;
   a service request terminal connected to said network; and
   a storage means connected to said network,
   wherein each of said service provision terminals and said service request terminal are configured to establish communication with each other by the use of a connectionless protocol,
   wherein said each of said service provision terminals has an information processing unit and a service provision functional unit,
   wherein said information processing unit has one or more objects which are programs used for requesting said service provision functional unit to provide its service, said object having at least one control function for requesting said service provision functional unit to provide said service, and each of said object being given a specific identifier in association with said control function, wherein said information processing unit is configured to, upon receiving a service request including said specific identifier, execute said control function indicated by said specific identifier included in said received service request, wherein said service provision functional unit is configured to provide said service when said information processing unit executes said control function, wherein said storage means has a storage unit storing a correspondence relation between said specific identifier of said object in said each of said service provision terminals and said address information of said service provision terminal, wherein said service request terminal has a service request functional unit configured to send said service request to said each of said service provision terminals, said service request functional unit being configured to send said service request including said specific identifier to said service provision terminal having said address information corresponding to said specific identifier used for the service request with reference to said correspondence relation stored in said storage unit, and wherein said storage means has a collecting functional unit configured to periodically receive said address information together with said specific identifier of said object from said each of said service provision terminals, said collecting functional unit being configured to periodically update said correspondence relation stored in said storage unit with reference to said received specific identifier and address information.

2. A network system as set forth in claim 1,
wherein said collecting functional unit is configured to periodically send a notice request to said each of said service provision terminals,
wherein said each of said service provision terminals is configured to, upon receiving said notice request, notify said storage means of said address information together with said specific identifier of said object, and
wherein said collecting functional unit is configured to collect both said address information and specific identifier of said object of which said each of said service provision terminals notifies said storage means, and to periodically update said correspondence relation stored in said storage unit.

3. A network system as set forth in claim 1,
wherein said each of said service provision terminals is configured to periodically notify said storage means of said address information together with said specific identifier of said object, and
wherein said collecting functional unit is configured to acquire both said address information and specific identifier of said object of which said each of said service provision terminals notifies said storage means, and to update said correspondence relation stored in said storage unit.

4. A network system as set forth in claim 1,
wherein said each of said service provision terminals is configured to notify said storage means of said specific identifier together with said address information when activated, and
wherein said collecting functional unit is configured to acquire both said address information and specific identifier of said object of which said each of said service provision terminals notifies said storage means, and to update said correspondence relation stored in said storage unit.

5. A network system as set forth in claim 1,
wherein said collecting functional unit is configured to collect said specific identifier of said object together with said address information from said service provision terminal having said address information not stored in said storage unit, and to store said correspondence relation between collected said specific identifier and said address information in said storage unit, when said address information corresponding to said specific identifier used for said service request is not stored in said storage unit, also when said service request functional unit sends said service request to said service provision terminal.

6. A network system as set forth in claim 1,
wherein said collecting functional unit is configured to, when said service request functional unit fails to access said service provision terminal to which said service request functional unit sends said service request on the basis of said address information stored in said storage unit, delete said correspondence relation including said address information used by said service request functional unit for access to said service provision terminal, and to collect said specific identifier together with said address information from said service provision terminal to which said service request functional unit tries to access, and to store said correspondence relation between collected said specific identifier and said address information in said storage unit.

7. A network system as set forth in claim 1,
wherein said network system comprises a plurality of said storage means,
wherein each of said storage means configured to, when said correspondence relation stored in said storage unit is changed, send a notification indicating said changed correspondence relation, and to update said correspondence relation stored in said storage unit to said changed correspondence relation upon receiving said notification.

8. A network system as set forth in claim 1,
wherein said network has a plurality of segments,
wherein said collecting functional unit is configured to establish a multicast communication to access said service provision terminal on said same segment when said collecting functional unit collects said correspondence relation from said service provision terminal on said same segment, and
wherein said collecting functional unit is configured to establish a unicast communication to access said service provision terminal on said different segment, when said collecting functional unit collects said correspondence relation from said service provision terminal on said different segment.

9. A network system as set forth in claim 1,
wherein said storage means is configured to delete from said storage unit said correspondence relation including said address information which is not used for a certain period after used in the latest communication.

10. A network system as set forth in claim 1,
wherein said specific identifier has an object unique identifier peculiarly assigned to said object, and an interface identifier assigned to said control function of said object, and wherein said storage unit is configured to store said corresponding relation indicating that different said address information is assigned to different said specific identifier.

11. A network system as set forth in claim 1,
wherein said specific identifier has an object unique identifier peculiarly assigned to said object, and an interface identifier assigned to said control function of said object, and
wherein said storage unit is configured to store said corresponding relation indicating that different said address information is assigned to different said object unique identifier.

12. A network system as set forth in claim 1,
wherein said specific identifier has an object unique identifier assigned to said object, and at least one interface identifier assigned to said control function of said object, wherein said storage unit is configured to store said correspondence relation in which said address information is alone assigned to said object unique identifier, when one of said object unique identifier corresponds to only one of said address information, and
wherein said storage unit is configured to store said correspondence relation including said address information having the largest number of said corresponded interface identifier, while assigning said address information alone to said object unique identifier, and to store said correspondence relation including said address information not having the largest number of said corresponded interface identifier, while assigning both said address information and interface identifier to said object unique identifier, when one of said object unique identifier corresponds to a plurality of said address information.

* * * * *